United States Patent
Yoon

(10) Patent No.: US 9,479,327 B2
(45) Date of Patent: Oct. 25, 2016

(54) APPARATUS AND METHOD FOR GENERATING KEY

(71) Applicant: SAMSUNG SDS CO., LTD., Seoul (KR)

(72) Inventor: Hyo-Jin Yoon, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/561,641

(22) Filed: Dec. 5, 2014

(65) Prior Publication Data

US 2016/0028538 A1 Jan. 28, 2016

(30) Foreign Application Priority Data

Jul. 23, 2014 (KR) .................. 10-2014-0093303

(51) Int. Cl.
*H04L 9/00* (2006.01)
*H04L 9/32* (2006.01)
*H04L 9/06* (2006.01)
*H04L 9/08* (2006.01)

(52) U.S. Cl.
CPC ........... *H04L 9/0631* (2013.01); *H04L 9/0861* (2013.01)

(58) Field of Classification Search
CPC ........ H04L 9/08; H04L 9/0861; G06F 21/72
USPC ................ 380/44, 277; 713/189, 193
See application file for complete search history.

(56) References Cited

U.S. PATENT DOCUMENTS

| 6,950,948 | B2 * | 9/2005 | Neff ................. H04L 9/006 705/12 |
| 7,353,541 | B1 * | 4/2008 | Ishibashi ............. G06F 21/10 348/E7.056 |
| 7,596,701 | B2 * | 9/2009 | Varghese ............ G06F 21/36 382/118 |
| 7,810,133 | B2 * | 10/2010 | Carter .................. G06F 21/606 713/164 |
| 2004/0049685 | A1 * | 3/2004 | Jaloveczki ............. G06F 21/36 713/182 |

* cited by examiner

*Primary Examiner* — Hosuk Song
(74) *Attorney, Agent, or Firm* — Sughrue Mion, PLLC

(57) ABSTRACT

Provided are an apparatus and method for generating a key. The apparatus includes: an input analyzer configured to identify a plurality of symbols from user identity (ID) information, and to derive at least one permutation from the plurality of symbols; and a key generator configured to obtain a plurality of pre-calculated keys including a plurality of first pre-calculated keys and at least one second pre-calculated key, and to generate, from the plurality of pre-calculated keys, a cryptographic key corresponding to the user ID information, the plurality of first pre-calculated keys respectively corresponding to the plurality of symbols, the at least one second pre-calculated key respectively corresponding to the at least one permutation.

25 Claims, 4 Drawing Sheets

APPARATUS AND METHOD FOR GENERATING KEY

CROSS-REFERENCE TO RELATED APPLICATION

This application claims priority to and the benefit of Korean Patent Application No. 10-2014-0093303, filed on Jul. 23, 2014, the disclosure of which is incorporated herein by reference in its entirety.

BACKGROUND

1. Field

Embodiments of the present disclosure relate to key generation and issuance, and more particularly, to a technology for generating, based on user identity (ID) information, a cryptographic key such as a private key of the user.

2. Discussion of Related Art

Unlike general public-key cryptography schemes, most ID-based cryptography (IBC) schemes require a pairing operation for encryption and decryption. As an alternative, an IBC scheme using a trapdoor discrete logarithm (TDL) group has been introduced. Such a TDL-IBC scheme involves an operation which is simpler than a pairing operation when encryption/decryption is performed on a client side, and therefore may be more useful for application to devices, for example, mobile communication terminals, than other IBC schemes.

The TDL-IBC scheme generates a key using a discrete logarithm problem that is practically difficult to solve when information on the trapdoor is not known. However, the TDL-IBC scheme may require a huge amount of resources for a process of extracting a private key corresponding to a user's ID, and it may take too much time to issue the private key. This means that excessively high cost would be incurred as the number of users increases. Therefore, there is a need for a new approach to practical application of an IBC scheme which uses a discrete logarithm cyclic group such as a TDL group.

SUMMARY

Embodiments of the present disclosure provide an improved technique for generating a cryptographic key based on user identity (ID) information and calculating, in advance, particular information necessary for the generation.

According to an exemplary embodiment, there is provided a key generation apparatus, including: an input analyzer configured to identify a plurality of symbols from user identity (ID) information, and to derive at least one permutation from the plurality of symbols; and a key generator configured to obtain a plurality of pre-calculated keys including a plurality of first pre-calculated keys and at least one second pre-calculated key, and to generate, from the plurality of pre-calculated keys, a cryptographic key corresponding to the user ID information, the plurality of first pre-calculated keys respectively corresponding to the plurality of symbols, the at least one second pre-calculated key respectively corresponding to the at least one permutation.

Each of the plurality of pre-calculated keys may represent a value of an element in a cyclic group, and the value may relate to one of the plurality of symbols or one of the at least one permutation.

The key generator may be further configured to apply a mathematical transformation to the plurality of pre-calculated keys to generate the cryptographic key.

Each of the plurality of symbols may be one of a plurality of candidate symbols, each of the at least one permutation may be one of a plurality of candidate permutations, and each of the plurality of candidate permutations may be derivable from at least part of the plurality of candidate symbols.

The key generation apparatus may further include: a storage having stored therein a plurality of subkeys arranged in a first predetermined number of subkey groups, the key generator may be further configured to search one or a plurality of subkey groups among the first predetermined number of subkey groups to obtain, from the storage, the plurality of first pre-calculated keys and the at least one second pre-calculated key, each of the first predetermined number of subkey groups may include a plurality of first subkeys and a plurality of second subkeys, each of the plurality of first subkeys may correspond to a respective one of the plurality of candidate symbols such that the plurality of first pre-calculated keys is obtainable from the storage, and each of the plurality of second subkeys may correspond to a respective one of the plurality of candidate permutations such that the at least one second pre-calculated key is obtainable from the storage.

Each of the plurality of candidate permutations may be a permutation of at least part of a second predetermined number of symbol indexes, and the input analyzer may be further configured to associate the plurality of symbols with a plurality of symbol indexes among the second predetermined number of symbol indexes, respectively, to derive a permutation of the plurality of symbol indexes as the at least one permutation.

The first predetermined number may be equal to one.

Each of the plurality of candidate permutations may be a permutation of at least part of a second predetermined number of symbol indexes, the input analyzer may be further configured to partition the plurality of symbols into a plurality of symbol groups, the at least one permutation may include a plurality of permutations respectively corresponding to the plurality of symbol groups, each of the plurality of symbol groups may include at least one of the plurality of symbols, and the input analyzer may be further configured to associate the at least one symbol with at least one symbol index among the second predetermined number of symbol indexes, respectively, to derive a permutation of the at least one symbol index as a corresponding one of the plurality of permutations for said each symbol group.

The first predetermined number may be equal to or greater than two, and the key generator may be further configured to identify a corresponding one of the plurality of subkey groups for said each symbol group to search the corresponding subkey group to obtain, from the storage, at least one of the plurality of first pre-calculated keys and one of the at least one second pre-calculated key, the at least one obtained first pre-calculated key respectively corresponding to the at least one symbol, the obtained second pre-calculated key corresponding to the permutation of the at least one symbol index.

The key generation apparatus may further include: a pre-calculator configured to calculate, and store in the storage, the plurality of subkeys before the input analyzer identifies the plurality of symbols.

Each first subkey may represent a first discrete logarithm value of a first element in a discrete logarithm cyclic group, each second subkey may represent a second discrete logarithm value of a second element in the discrete logarithm cyclic group, and the pre-calculator may be further configured to generate the first element from the respective candidate symbol to calculate the first discrete logarithm value, and to generate the second element from the respective candidate permutation to calculate the second discrete logarithm value.

The pre-calculator may be further configured to apply a hash function to the respective candidate symbol to generate the first element, and to apply the hash function to the respective candidate permutation to generate the second element.

According to another exemplary embodiment, there is provided a key generation method, including: identifying a plurality of symbols from user identity (ID) information; deriving at least one permutation from the plurality of symbols; obtaining a plurality of pre-calculated keys including a plurality of first pre-calculated keys and at least one second pre-calculated key, the plurality of first pre-calculated keys respectively corresponding to the plurality of symbols, the at least one second pre-calculated key respectively corresponding to the at least one permutation; and generating, from the plurality of pre-calculated keys, a cryptographic key corresponding to the user ID information.

Each of the plurality of pre-calculated keys may represent a value of an element in a cyclic group, and the value may relate to one of the plurality of symbols or one of the at least one permutation.

The key generation method may further include: applying a mathematical transformation to the plurality of pre-calculated keys to generate the cryptographic key.

Each of the plurality of symbols may be one of a plurality of candidate symbols, each of the at least one permutation may be one of a plurality of candidate permutations, and each of the plurality of candidate permutations may be derivable from at least part of the plurality of candidate symbols.

The key generation method may further include: storing, in a storage, a plurality of subkeys arranged in a first predetermined number of subkey groups in a storage; and searching one or a plurality of subkey groups among the first predetermined number of subkey groups to obtain, from the storage, the plurality of first pre-calculated keys and the at least one second pre-calculated key, each of the first predetermined number of subkey groups may include a plurality of first subkeys and a plurality of second subkeys, each of the plurality of first subkeys may correspond to a respective one of the plurality of candidate symbols such that the plurality of first pre-calculated keys are obtainable from the storage, and each of the plurality of second subkeys may correspond to a respective one of the plurality of candidate permutations such that the at least one second pre-calculated key is obtainable from the storage.

Each of the plurality of candidate permutations may be a permutation of at least part of a second predetermined number of symbol indexes, and the key generation method may further include: associating the plurality of symbols with a plurality of symbol indexes among the second predetermined number of symbol indexes, respectively, to derive a permutation of the plurality of symbol indexes as the at least one permutation.

The first predetermined number may be equal to one.

Each of the plurality of candidate permutations may be a permutation of at least part of a second predetermined number of symbol indexes, and the key generation method may further include: partitioning the plurality of symbols into a plurality of symbol groups, the at least one permutation including a plurality of permutations respectively corresponding to the plurality of symbol groups, each of the plurality of symbol groups including at least one of the plurality of symbols; and associating the at least one symbol with at least one symbol index among the second predetermined number of symbol indexes, respectively, to derive a permutation of the at least one symbol index as a corresponding one of the plurality of permutations for said each symbol group.

The first predetermined number may be equal to or greater than two, and the key generation method may further include: identifying a corresponding one of the plurality of subkey groups for said each symbol group to search the corresponding subkey group to obtain, from the storage, at least one of the plurality of first pre-calculated keys and one of the at least one second pre-calculated key, the at least one obtained first pre-calculated key respectively corresponding to the at least one symbol, the obtained second pre-calculated key corresponding to the permutation of the at least one symbol index.

The key generation method may further include: before the identifying of the plurality of symbols, calculating the plurality of subkeys to store the plurality of subkeys in the storage.

Each first subkey may represent a first discrete logarithm value of a first element in a discrete logarithm cyclic group, each second subkey may represent a second discrete logarithm value of a second element in the discrete logarithmic cyclic group, and the key generation method may further include: generating the first element from the respective candidate symbol to calculate the first discrete logarithm value; and generating the second element from the respective candidate permutation to calculate the second discrete logarithm value.

The key generation method may further include: applying a hash function to the respective candidate symbol to generate the first element; and applying the hash function to the respective candidate permutation to generate the second element.

According to still another exemplary embodiment, there is provided a computer program stored in a computer readable medium to perform in combination with hardware: identifying a plurality of symbols from user identity (ID) information; deriving at least one permutation from the plurality of symbols; obtaining a plurality of pre-calculated keys including a plurality of first pre-calculated keys and at least one second pre-calculated key, the plurality of first pre-calculated keys respectively corresponding to the plurality of symbols, the at least one second pre-calculated key respectively corresponding to the at least one permutation; and generating, from the plurality of pre-calculated keys, a cryptographic key corresponding to the user ID information.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. The following detailed description is provided to help comprehensive understanding of methods, devices and/or systems described in this specification. However, these are only examples, and the present disclosure is not limited thereto.

In the description below, when it is determined that detailed descriptions of related well-known functions unnecessarily obscure the gist of the present disclosure, detailed descriptions thereof will be omitted. Some terms described below are defined by considering functions in the present disclosure and meanings may vary depending on, for example, a user or operator's intentions or customs. Therefore, the meanings of terms should be interpreted based on the scope throughout this specification. The terminology used in detailed description is provided to only describe the example embodiments and not for purposes of limitation. Unless the context clearly indicates otherwise, the singular forms include the plural forms. It will be understood that the terms "comprises" or "includes" when used herein, specify some features, numbers, steps, operations, elements, and/or combinations thereof, but do not preclude the presence or possibility of one or more other features, numbers, steps, operations, elements, and/or combinations thereof in addition to the description. Likewise, the description of an example embodiment in terms of a combination of elements does not preclude the implementation of a suitable subcombination of elements.

Figure 1:
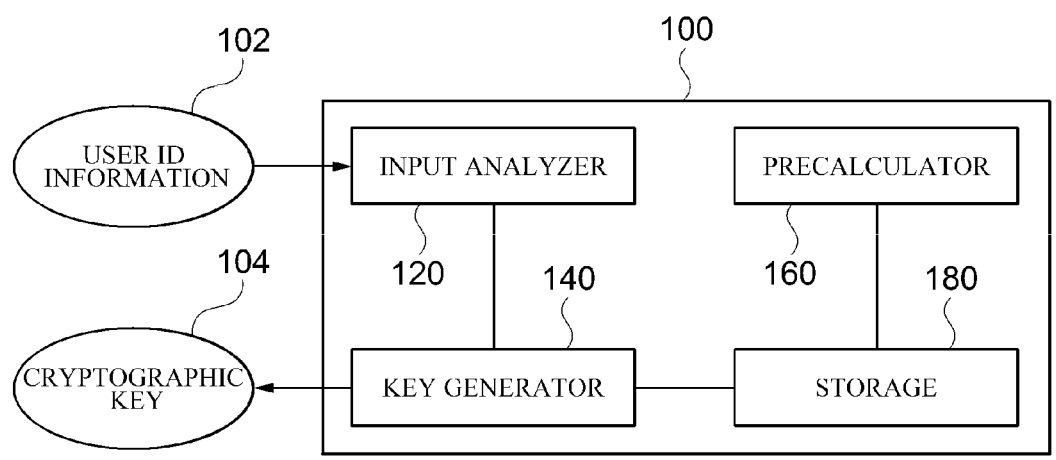
FIG. 1 is a block diagram of a key generation system according to an exemplary embodiment.

FIG. 1 is a block diagram of a key generation system according to an exemplary embodiment.

The exemplary key generation system 100 is configured to generate a cryptographic key 104 from user identity (ID) information 102. The key generation system 100 may be used to issue a private key to a user using an ID-based cryptography (IBC) scheme (e.g., a trapdoor discrete logarithm (TDL)-IBC scheme).

The user ID information 102 provided to the key generation system 100 may include a plurality of symbols constituting a user ID. A typical example of a symbol that is available for a user ID is an English alphabet letter (an uppercase letter and/or a lowercase letter), a numeral, a special character, such as a period ("."), or another character, such as a multi-bit character. Another example of such a symbol is the string of a predetermined number of bits.

The user ID information 102 may further include additional symbols. In some exemplary embodiments, the user ID information 102 may have the symbols representing the user ID and padding appended to the symbols. For example, the padding may include a symbol representing a date (e.g., a set of at least one character representing a year, a month, a day, and/or a quarter) and/or a symbol representing a version.

The key generation system 100 may generate the user's private key based on the user's ID as follows. When a specific element $H=g^x$ mod q (g is a generator and q is a prime number) in a discrete logarithm cyclic group (e.g., a TDL group) is a public key corresponding to the user ID, a key generated to represent a discrete logarithm value x of the element H is cryptographically secure enough. Therefore, this key may be issued as a private key to the user. In the key generation system 100, discrete logarithm values corresponding to all symbols that are available to represent the user ID information 102 (each of the discrete logarithm values may be referred to as a "candidate symbol" below) have been calculated in advance. When the user ID information 102 is given, the key generation system 100 may generate the discrete logarithm value x of the element H as a private key corresponding to the user ID information 102. Accordingly, the key generation system 100 may generate the private key corresponding to the user ID information 102 within a very short time (e.g., in real time) and issue the private key to the user. Also, the discrete logarithm values corresponding to the candidate symbols may be prepared with a small amount of precalculation. Further, to ensure enough cryptographic security even when the total number of candidate symbols available for the user ID information is not very large, the key generation system 100 may use a permutation of the symbols in the user ID information 102 or may partition the symbols in the user ID information 102 and use a permutation of symbols in each partition.

More specifically, as shown in FIG. 1, the exemplary key generation system 100 may include an input analyzer 120, a key generator 140, a precalculator 160, and a storage 180. Each component of the key generation system 100 may be implemented in hardware (e.g., a processor, a memory, and an input/output (I/O) interface).

The input analyzer 120 may receive the user ID information 102 including the symbols. For convenience of description, it is assumed below that one symbol is one of a total of 63 characters consisting of English alphabet lowercase letters from "a" to "z," English alphabet uppercase letters from "A" to "Z," one-digit numbers from "0" to "9," and a period "." In other words, in the following description, each of the 63 characters is a candidate symbol, and each of the plurality of symbols included in the user ID information 102 is one of the 63 candidate symbols. However, the following description is merely an example, and it is also possible to use another number and/or other types of candidate symbols (e.g., a total of 36 candidate symbols consisting of the 26 English alphabet lowercase letters and the one-digit numbers, or candidate symbols each of which consists of two or more characters).

In some exemplary embodiments, the total number of symbols in the user ID information 102 may be limited. In addition, the total number may have a lower limit to prevent a security leakage. For example, the user ID information 102 may be required to include at least eight and at most 20 symbols.

The input analyzer 120 may identify the symbols from the received user ID information 102, and derive at least one permutation from the identified symbols. Since each of the identified symbols is one of the candidate symbols, each of the derived at least one permutation may be one of the permutations derivable from at least some of the candidate symbols (each of the derivable permutations may be referred to as a "candidate permutation" below).

The key generator 140 may acquire pre-calculated keys and generate the cryptographic key 104 corresponding to the user ID information 102 from the acquired pre-calculated keys. Each of the pre-calculated keys may represent the discrete logarithm value of an element in a discrete logarithm cyclic group. The pre-calculated keys may include first pre-calculated keys respectively corresponding to the identified symbols. Also, the pre-calculated keys may include at least one second pre-calculated key respectively corresponding to the derived at least one permutation.

Before the input analyzer 120 identifies the user ID information 102, the precalculator 160 may calculate pre-calculated keys available for generating the cryptographic key 104 (each of the available pre-calculated keys may be referred to as a "subkey" below) in advance and store the subkeys in the storage 180. Each candidate symbol may correspond to at least one of the subkeys, and each candidate permutation may correspond to at least one of the subkeys. Therefore, the key generator 140 may acquire the pre-calculated keys necessary to generate the cryptographic key 104 from the storage 180.

The subkeys stored in the storage 180 may be arrayed in one or more subkey groups. The total number of subkey groups may be set in advance according to a predetermined policy (e.g., whether or not to apply partitioning to the user ID information 102, the maximum number of symbols in each partition when the partitioning is applied, or the upper limit of the total number of symbols in the user ID information 102). Each subkey group may include first subkeys corresponding to the candidate symbols on a one-to-one basis, and thus it may be possible to acquire first pre-calculated keys necessary to generate the cryptographic key 104 from the storage 180. Also, each subkey group may include second subkeys corresponding to the candidate permutations on a one-to-one basis, and thus it may be possible to acquire at least one second pre-calculated key necessary to generate the cryptographic key 104 from the storage 180.

Exemplary implementations of the key generation system 100 will be described in further detail below.

Exemplary Approach to Key Generation Using Permutation

Figure 2:
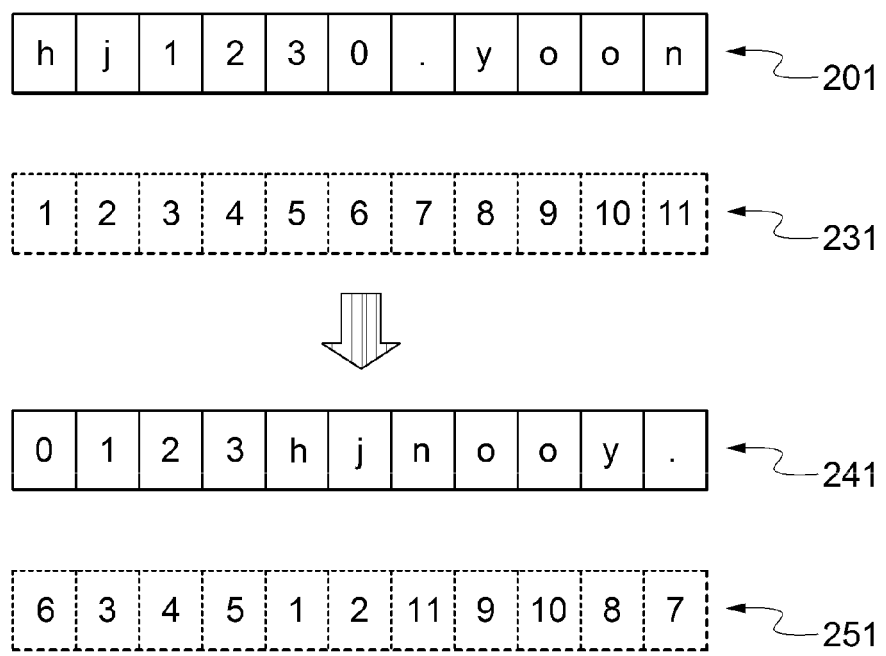
FIG. 2 is a diagram illustrating a mechanism for deriving a permutation from symbols in user identity (ID) information according to an exemplary embodiment.

As an example for description, the input analyzer 120 may receive user ID information 201 of FIG. 2 (i.e., "hj1230.yoon" including 11 symbols) and identify the symbols from the received user ID information 201. As shown in FIG. 2, the user ID information 201 may be expressed as a symbol sequence in which the same symbols appear a plurality of times ("o" appearing twice).

The input analyzer 120 may associate the identified symbols with the same number of symbol indexes, respectively. The symbol indexes corresponding to the symbols in the user ID information 201 on a one-to-one basis in this way may be at least some of a predetermined number of symbol indexes. For example, when any user ID information input to the input analyzer 120 is required to include at most 20 and at least 8 symbols, the input analyzer 120 may select symbol indexes from the symbol index "1" to a symbol index indicating the total number of symbols in the user ID information from among 20 symbol indexes from "1" to "20," and index the symbols with the selected symbol indexes. Accordingly, as shown in FIG. 2, the user ID information 201 may have a corresponding symbol index set 231. Referring to FIG. 2, the 11 symbols in the user ID information 201 ("h," "j," "1," "2," "3," "0," ".," "y," "o," "o," and "n") correspond to 11 symbol indexes ("1," "2," "3," "4," "5," "6," "7," "8," "9," "10," and "11") in the symbol index set 231, respectively.

Then, the input analyzer 120 may derive one of all possible permutations of the 11 symbol indexes in the symbol index set 231. In some exemplary embodiments, the input analyzer 120 may arrange the 11 symbols in the user ID information 201 in a specific order. For example, when numbers, English alphabet uppercase letters, English alphabet lowercase letters have decreasing priority orders in sequence, and a period, and numbers and English alphabet letters are arranged in ascending order, the input analyzer 120 may derive a permutation 251 of the 11 symbols in the symbol index set 231 (i.e., {"6," "3," "4," "5," "1," "2," "11," "9," "10," "8," "7"}) as shown in FIG. 2. An array 241 schematically shows a positional relationship of the symbols in the user ID information 201 according to the permutation 251.

As mentioned above, the key generator 140 may generate the cryptographic key 104 corresponding to the user ID information 102 from the pre-calculated keys. For exemplary description, it is assumed that the cryptographic key 104 is defined to be a discrete logarithm value x of a hash value H(ID) given as the following equation.

$$H(ID)=f\{h_1(s_1), \ldots, h_n(s_n), h'(\pi)\} \quad \text{[Equation 1]}$$

Here, ID may be the user ID information 102, n may be the total number of symbols included in the user ID information 102, $s_i$ ($1 \leq i \leq n$) may be a symbol included in the user ID information 102, $\pi$ may be a permutation derived from the symbols included in the user ID information 102, and $h_i$ ($1 \leq i \leq n$) and h' may be hash functions defined in a discrete logarithm cyclic group (e.g., cryptographically secure SHA1, SHA-256, SHA-512, etc.).

In some exemplary embodiments, $h_i$ and h' are the same hash function h, and f may be defined to be a multiplication of respective factors. In this case, H(ID) may be given as the following equation.

$$H(ID)=h(s_1)^* \ldots {}^*h(s_n)^*h(\pi) \quad \text{[Equation 2]}$$

When the discrete logarithm value of a hash function value h(z), which is an element in the discrete logarithm cyclic group, is x(z), the cryptographic key 104 corresponding to the user ID information 102 may be given as the following equation.

$$x=x(s_1)+ \ldots +x(s_n)+x(\pi) \quad \text{[Equation 3]}$$

As seen from the above equation, x may be calculated from discrete logarithm values ($x(s_1), \ldots, x(s_n)$, and $x(\pi)$), each of which may be one of the symbols included in the user ID information 102 or a key corresponding to a permutation derived from the symbols in the user ID information 102. Before the user ID information 102 is input to the input analyzer 120, these discrete logarithm values may be calculated by the precalculator 160 and stored in the storage 180 in advance. The key generator 140 may access the storage 180 to acquire necessary discrete logarithm values, and generate the cryptographic key 104 using the acquired discrete logarithm values (for example, applying a mathematical transformation to the acquired discrete logarithm values).

In this case, H(ID) corresponding to the user ID information 201 of FIG. 2 may be represented as the following equation.

$$H(\text{"hj1230.yoon"})=h(\text{"h"})^*h(\text{"j"})^*h(\text{"1"})^*h(\text{"2"})^{**}h(\text{"3"})^*h(\text{"0"})^*h(\text{"."})^*h(\text{"y"})^*h(\text{"o"})^*h(\text{"n"})^*h(\{\text{"6","3","4","5","1","2","11","9","10","8","7"}\}) \quad \text{[Equation 4]}$$

Then, a private key x corresponding to the user ID information 201 of FIG. 2 may be derived from the following equation.

$$x=x(\text{"h"})+x(\text{"j"})+x(\text{"1"})+x(\text{"2"})+x(\text{"3"})+x(\text{"0"})+x(\text{"."})+x(\text{"y"})+x(\text{"o"})+x(\text{"o"})+x(\text{"n"})+x(\{\text{"6","3","4","5","1","2","11","9","10","8","7"}\}) \quad \text{[Equation 5]}$$

Here, x(z) is the discrete logarithm value of the hash value h(z) (z is a symbol or a permutation). The key generator 140 may acquire the discrete logarithm values x(z) from the storage 180, and calculate x by summing the acquired discrete logarithm values x(z). The calculated x may be issued as the cryptographic key 104.

To this end, in some exemplary embodiments, the precalculator 160 may perform the following operations.

The precalculator 160 may calculate first subkeys respectively corresponding to the 63 candidate symbols. For example, (e.g., by applying the hash function to the symbol "A") the precalculator 160 may generate a specific element in the discrete logarithm cyclic group from the symbol. Subsequently, the precalculator 160 may calculate the discrete logarithm value of the element. The precalculator 160 may store the calculated discrete logarithm value in the storage 180 as a first subkey corresponding to the symbol "A."

Also, the precalculator 160 may calculate second subkeys respectively corresponding to candidate permutations. For example, (e.g., by applying the hash function to the permutation {"2," "1," "3," "4," "5," "6," "7," "8"}) the precalculator 160 may generate a specific element in the discrete logarithm cyclic group from the permutation. Subsequently, the precalculator 160 may calculate the discrete logarithm value of the element. The precalculator 160 may store the calculated discrete logarithm value in the storage 180 as a second subkey corresponding to the permutation {"2," "1," "3," "4," "5," "6," "7," "8"}.

As mentioned above, the symbols in the user ID information 102 may respectively correspond to at least a part of 20 symbol indexes from "1" to "20." For example, symbol indexes corresponding to the symbols on a one-to-one basis may be N sequential symbol indexes from "1" to a total number N (8≤N≤20) of the symbols. Accordingly, the candidate permutations may include permutations of eight symbol indexes ("1" to "8") to permutations of 19 symbol indexes ("1" to "19") in addition to 20! permutations of the 20 symbol indexes ("1" to "20"). Therefore, when candidate permutations are set as mentioned above, the permutation {"2," "1," "3," "4," "5," "6," "7," "8," "9"} of the user ID information "bacdefghi" and the permutation {"2," "1," "3," "4," "5," "6," "7," "8"} of the user ID information "bacdefgh" may correspond to different hash values, and discrete logarithm values derived from the hash values may differ from each other.

Subkeys calculated in advance by the precalculator 160 and stored in the storage 180 may be arrayed in a predetermined number of subkey groups. For example, the aforementioned first subkeys and second subkeys may be included in one subkey group. Accordingly, the key generator 140 may search for the subkey group to acquire precalculated keys necessary to generate the cryptographic key 104 from the storage 180.

Exemplary Approach to Key Generation Using Permutation and Partitioning

Figure 3:
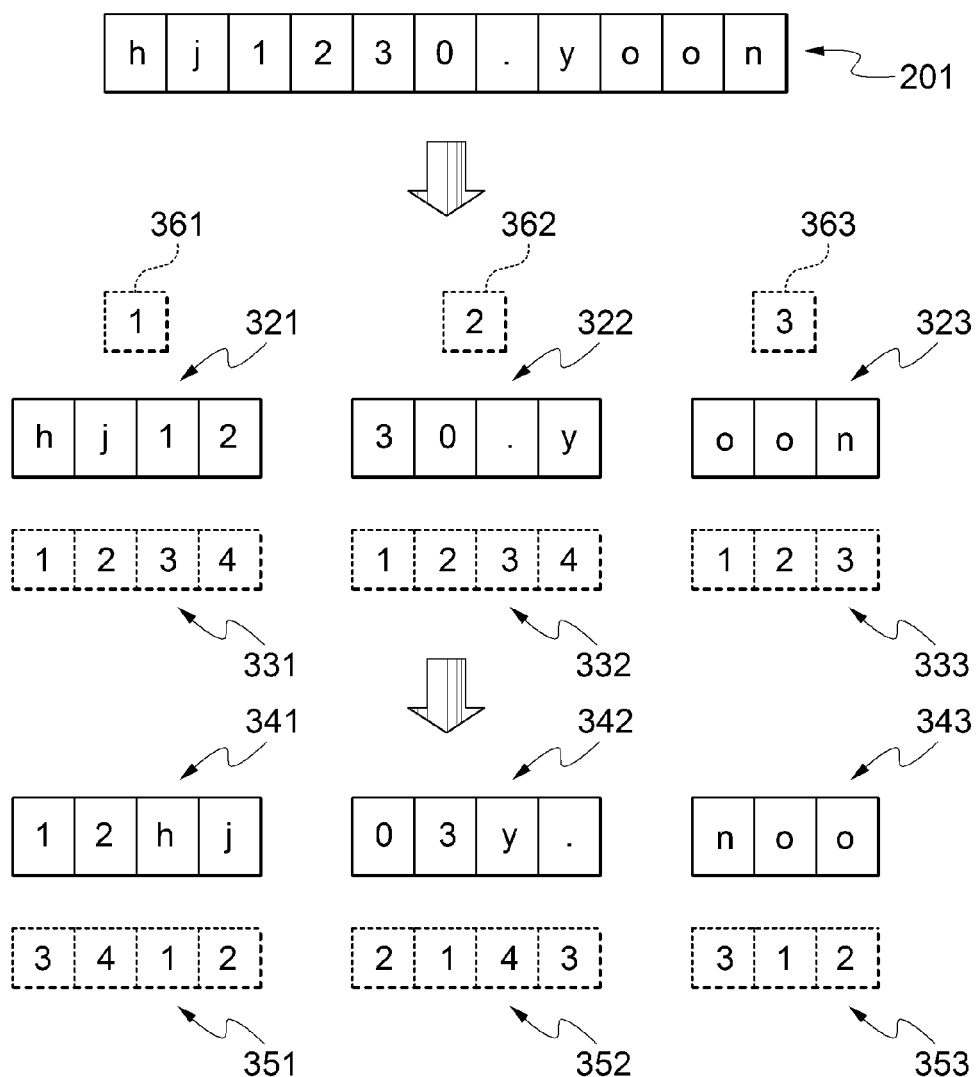
FIG. 3 is a diagram illustrating a mechanism for partitioning symbols in user ID information into symbol groups and deriving a permutation from each symbol group according to an exemplary embodiment.

As shown in FIG. 3, similar to FIG. 2, the input analyzer 120 may receive user ID information 201 (i.e., "hj1230.yoon" including 11 symbols) and identify the symbols from the received user ID information 201. Also, the input analyzer 120 may partition the identified symbols into a plurality of symbol groups. Each symbol group may include at least one of the symbols included in the user ID information 201. The maximum number of symbols in each symbol group may be set in advance. When the maximum number of symbols in each symbol group is set to four in advance, the input analyzer 120 may partitions the user ID information 201 into three symbol groups 321, 322, and 323 as shown in FIG. 3. In this way, the number of symbols included in a symbol group (e.g., the symbol group 323) may be smaller than the maximum number.

The input analyzer 120 may associate at least one symbol in each symbol group with the same number of symbol indexes, respectively. At least one symbol index corresponding to at least one symbol in each symbol group on a one-to-one basis in this way may be at least some of a predetermined number of symbol indexes. For example, when any symbol group is required to include four symbols at most, the input analyzer 120 may select at least one symbol index from "1" to the total number of symbols in the symbol group from among four symbol indexes from "1" to "4," and index at least one symbol in the symbol group with the selected at least one symbol index. Accordingly, as shown in FIG. 3, the symbol groups 321, 322, and 323 may have respective symbol index sets 331, 332, and 333. Referring to FIG. 3, it is possible to see that (i) the symbols in the symbol group 321 ("h," "j," "1," and "2") correspond to the symbol indexes in the symbol index set 331 ("1," "2," "3," and "4") on a one-to-one basis, (ii) the symbols in the symbol group 322 ("3," "0," ".," and "y") correspond to the symbol indexes in the symbol index set 332 ("1," "2," "3," and "4") on a one-to-one basis, and (iii) the symbols in the symbol group 323 ("o," "o," and "n") correspond to the symbol indexes in the symbol index set 333 ("1," "2," and "3") on a one-to-one basis.

Subsequently, from each of the symbol groups 321, 322, and 323, the input analyzer 120 may derive one of all possible permutations of symbol indexes in the symbol index set 331, 332, or 333 of the symbol group. In this way, derived permutations may correspond to the symbol groups 321, 322, and 323. For example, the input analyzer 120 may arrange four symbols in the symbol group 321 in a specific order. For example, when numbers, English alphabet uppercase letters, English alphabet lowercase letters, and a period have decreasing priority orders in sequence, and numbers and English alphabet letters are arranged in ascending order, the input analyzer 120 may derive a permutation 351 of the symbol indexes in the symbol index set 331 (i.e., {"3," "4," "1," "2"}) as shown in FIG. 3. An array 341 schematically shows a positional relationship of the symbols in symbol group 321 according to the permutation 351. Likewise, as seen from arrays 342 and 343, a permutation 352 of the symbol indexes in the symbol index set 332 of the symbol group 322 and a permutation 353 of the symbol indexes in the symbol index set 333 of the symbol group 323 may be derived.

As mentioned above, the key generator 140 may generate the cryptographic key 104 corresponding to the user ID information 102 from the pre-calculated keys. For exemplary description, it is assumed that the cryptographic key 104 is defined to be a discrete logarithm value x of a hash value H(ID) given as the following equation.

$$H(ID)=f\{h_2(s_1), \ldots, h_n(s_n), h'_2(\pi_1), \ldots, h'_p(\pi)\} \qquad \text{[Equation 6]}$$

Here, ID may be the user ID information 102, n may be the total number of symbols included in the user ID information 102, p may be the total number of symbol groups into which the user ID information 102 has been partitioned, $s_i$ (1≤i≤n) may be a symbol included in the user ID information 102, $\pi_j$ (1≤j≤p) may be a permutation corresponding to a symbol group, and $h_i$ (1≤i≤n) and $h'_j$ (1≤j≤n) may be hash functions defined in a discrete logarithm cyclic group (e.g., cryptographically secure SHA1, SHA-256, SHA-512, etc.).

In some exemplary embodiments, $h_i$ and $h'_j$ are the same hash function h, and f may be defined to be a multiplication of respective factors. In this case, H(ID) may be given as the following equation.

$$H(ID)=h(s_1)* \ldots *h(s_n)*h(s_n)*h(\pi_1)* \ldots *h(\pi_p) \quad \text{[Equation 7]}$$

When the discrete logarithm value of a hash function value h(z), which is an element in the discrete logarithm cyclic group, is x(z), the cryptographic key 104 corresponding to the user ID information 102 may be given as the following equation.

$$x=x(s_1)+ \ldots +x(s_n)+x(\pi_1)+ \ldots +x(\pi_p) \quad \text{[Equation 8]}$$

As seen from the above equation, x may be calculated from discrete logarithm values $(x(s_1), \ldots, x(s_n), x(\pi_1), \ldots, x(\pi_p))$, each of which may be one of the symbols included in the user ID information 102 or a key corresponding to one of permutations derived from the symbols in the user ID information 102 and applied to the symbol groups. Before the user ID information 102 is input to the input analyzer 120, these discrete logarithm values may be calculated by the precalculator 160 and stored in the storage 180 in advance. The key generator 140 may access the storage 180 to acquire necessary discrete logarithm values, and generate the cryptographic key 104 using the acquired discrete logarithm values (for example, applying a mathematical transformation to the acquired discrete logarithm values).

In some exemplary embodiments, the hash value h(z) may be dependent on a symbol group including a symbol z or a symbol group corresponding to a permutation z. In other words, the hash value may be given as $h(z)=h(j, z)(1 \leq j \leq p)$. To this end, the key generator 140 may associate and index a symbol included in each symbol group and a permutation corresponding to the symbol group with a group index corresponding to the symbol group. Group indexes 361, 362, and 363 corresponding to the symbol groups 321, 322, and 323 on a one-to-one basis in this way may be at least some of a predetermined number of group indexes. For example, when any user ID information input to the input analyzer 120 is required to include 20 symbols at most and any symbol group is required to include four symbols at most, the input analyzer 120 may have a policy of partitioning the user ID information such that as many symbol groups as possible have four symbols. According to the partitioning policy, symbols in the user ID information may be partitioned into five groups at most. Therefore, the key generator 140 may select group indexes from "1" to the total number of symbol groups into which the symbols in the user ID information have been partitioned from among five group indexes from "1" to "5," and index the symbol groups with the selected group indexes.

As a detailed example, the key generator 140 may associate and index each of the symbols ("h," "j," "1," and "2") in the symbol group 321 of FIG. 3 and the permutation 351 ({"3," "4," "1," "2"}) corresponding to the symbol group 321 with "1" corresponding to the group index 361. Likewise, the key generator 140 may perform indexing operations on the symbol groups 322 and 323 with "2" corresponding to the group index 362 and "3" corresponding to the group index 363, respectively.

In this case, H(ID) corresponding to the user ID information 201 of FIG. 3 may be represented as the following equation.

$$H(``hj1230,yoon")=h(1,``h")*h(1,``j")*h(1,``1")*h(1,``2")*h(1,\{``3",``4",``1",``2"\})*h(2,``3")*h(2,``0")*h(2,``.")*h(2,``y")*h(2,\{``2",``1",``4",``3"\})*h(3,``o")*h(3,``o")*h(3,``n")*h(3,\{``3",``1",``2"\}) \quad \text{[Equation 9]}$$

Then, a private key x corresponding to the user ID information 201 of FIG. 3 may be derived from the following equation.

$$x=x(1,``h")+x(1,``j")+x(1,``1")+x(1,``2")+x(1,\{``3",``4",``1",``2"\})+x(2,``3")+x(2,``0")+x(2,``.")+x(2,``y")+x(2,\{``2",``1",``4",``3"\})+x(3,``o")+x(3,``o")+x(3,``n")+x(3,\{``3",``1",``2"\}) \quad \text{[Equation 10]}$$

Here, x(j, z) is the discrete logarithm value of the hash value h(j, z) $(1 \leq j \leq p)$. The key generator 140 may acquire discrete logarithm values x(j, z) from the storage 180, and calculate x by summing the acquired discrete logarithm values. The calculated x may be issued as the cryptographic key 104.

Operations performed by the precalculator 160 for this purpose according to some exemplary embodiments will be described in further detail below. In particular, to calculate in advance keys that may be necessary for the key generator 140 to generate the cryptographic key 104, the precalculator 160 may consider symbol groups including the symbols in the user ID information 102 among a predetermined number or less of symbol groups, and symbol groups corresponding to derived permutations among the symbol groups. For example, the symbols in the user ID information 102 may be partitioned into five symbol groups at most, and the symbol groups may respectively correspond to at least some of five group indexes from "1" to "5."

The precalculator 160 may associate and index the 63 candidate symbols with group indexes. Also, the precalculator 160 may calculate first subkeys respectively corresponding to the indexed candidate symbols. Similar to the above-described method, the precalculator 160 may generate a specific element in a discrete logarithm cyclic group to calculate first subkeys and calculate discrete logarithm values corresponding to the element. To generate the element, a hash function may be used. However, it is to be noted that different hash values may be calculated (e.g., using different hash functions) according to group indexes with which a symbol is indexed.

For example, the precalculator 160 may generate five indexed symbols by indexing the symbol "A" with five group indexes "1," "2," "3," "4," and "5." In this way, the precalculator 160 may index the total of 63 symbols with each of the five indexes and thereby generate 63*5=315 indexed symbols. Then, the precalculator 160 may calculate 315 first subkeys corresponding to the 315 indexed symbols. Therefore, according to a symbol group in which the symbol "A" is included (e.g., whether the symbol "A" is indexed with the group index "1" or the group index "5"), a first subkey corresponding to the symbol may vary.

Further, the precalculator 160 may index candidate permutations with the group indexes, respectively. Also, the precalculator 160 may calculate second subkeys corresponding to the indexed candidate permutations. Similar to the above-described method, the precalculator 160 may generate a specific element in the discrete logarithm cyclic group to calculate second subkeys and calculate discrete logarithm values corresponding to the element. To generate the element, a hash function may be used. However, it is to be noted that different hash values may be calculated (e.g., using different hash functions) according to group indexes with which a permutation is indexed.

In some exemplary embodiments, candidate permutations may be given as follows. As mentioned above, when the number of symbols in each symbol group is 1 or more and 4 or less, at least one symbol in each symbol group may correspond to at least some of four symbol indexes of "1" to "4." For example, at least one symbol index corresponding to at least one symbol on a one-to-one basis may be M sequential symbol indexes from "1" to a total number M (1≤M≤4) of the symbol indexes. Accordingly, in addition to (i) 4! permutations derivable from the four symbol indexes "1," "2," "3," and "4," candidate permutations may include (ii) 3! permutations derivable from three symbol indexes "1," "2," and "3," (iii) 2! permutations derivable from two symbol indexes "1" and "2," and (iv) one permutation {"1"} derivable from one symbol index "1." Therefore, when candidate permutations are set as mentioned above, the permutation ({"3," "1," "2," "4"}) of the symbol group "oonx" and the permutation ({"3," "1," "2"}) of the symbol group "oon" may correspond to different hash values, and discrete logarithm values derived from the hash values may also differ from each other.

For example, the precalculator 160 may generate five indexed permutations by indexing the permutation {"3," "1," "2"} with each of the five group indexes "1," "2," "3," "4," and "5." In this way, the precalculator 160 may index each of 4!+3!+2!+1! (=33) permutations with the five group indexes to generate 33*5=165 indexed permutations. Then, the precalculator 160 may calculate second subkeys corresponding to the 165 indexed permutations. In this way, according to a symbol group corresponding to the permutation {"3," "1," "2"} (e.g., whether the permutation {"3," "1," "2"} is indexed with the group index "1" or the group index "5"), the second subkey corresponding to the permutation may vary.

Subkeys that are calculated by the precalculator 160 in advance and stored in the storage 180 may be arrayed in a predetermined number of subkey groups. For example, when the symbols in the user ID information 102 are partitioned into five symbol groups at most, the aforementioned first subkeys and second subkeys may be included in five subkey groups. One of the five subkey groups corresponding to each symbol group may include first subkeys corresponding to candidate symbols indexed with a group index corresponding to the symbol group and second subkeys corresponding to candidate permutations indexed with the group index. Accordingly, to acquire pre-calculated keys necessary to generate the cryptographic key 104 from the storage 180, the key generator 140 may search for a plurality of subkey groups among the five subkey groups (e.g., three subkey groups corresponding to the group indexes "1" to "3" when the total number of symbol groups is three). For example, referring back to FIG. 3, the key generator 140 may search for a subkey group corresponding to the symbol group 321 indexed with "1" corresponding to the group index 361 to acquire first pre-calculated keys corresponding to the symbols in the symbol group 321 ("h," "j," "1," and "2") and a second pre-calculated key corresponding to the permutation 351 ({"3," "4," "1," "2"}) from the storage 180. This is the same for the symbol groups 322 and 323.

In some exemplary embodiments, the key generation system 100 may be implemented or included in a computing device. Such a computing device may include one or more processors and computer-readable storage media accessible by the processors. The computer-readable storage media may be disposed in or outside the processors, and connected to the processors with various well-known means. The computer-readable storage media may store computer-executable instructions therein. The processors may execute the instructions stored in the computer-readable storage media. Such instructions may cause the computing device to perform operations according to an exemplary embodiment when executed by the processors. In some other exemplary embodiments, the input analyzer 120 and the key generator 140 may be implemented on one computing device by the hardware of the computing device, and the precalculator 160 and the storage 180 may be implemented on another computing device by the hardware of the other computing device.

Figure 4:
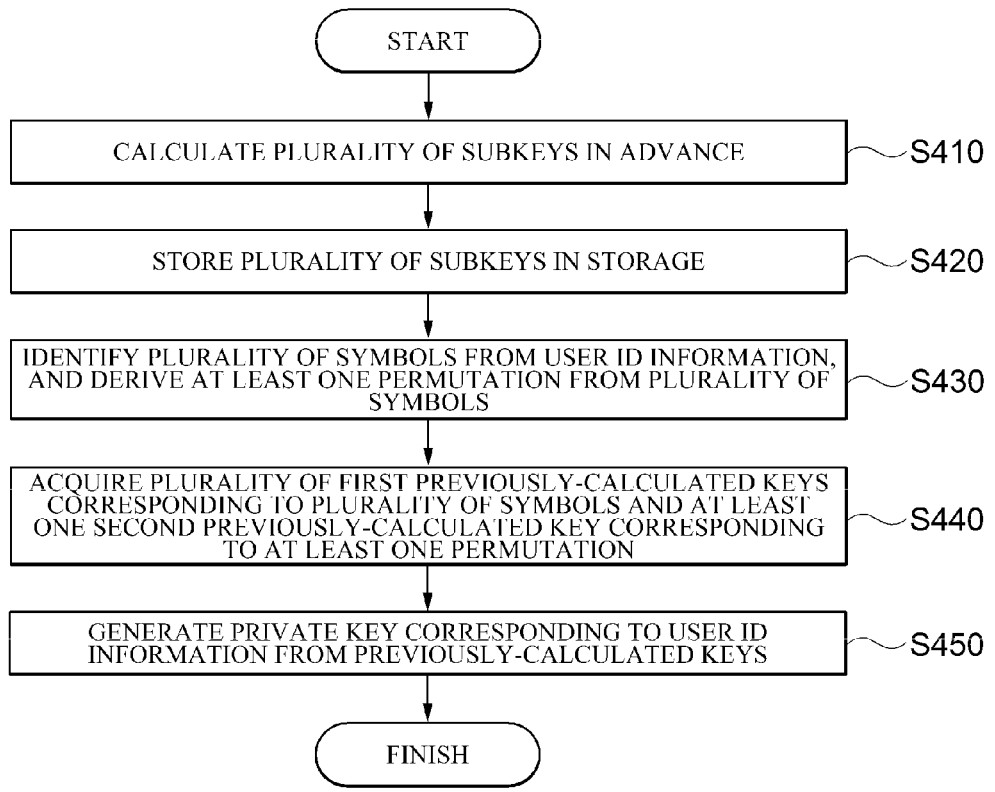
FIG. 4 is a flowchart illustrating a process for generating a private key corresponding to user ID information according to an exemplary embodiment.

FIG. 4 is a flowchart illustrating a process for generating a private key corresponding to user ID information according to an exemplary embodiment. For example, operations included in an exemplary process 400 may be performed by the key generation system 100.

After a start operation, the process 400 proceeds to operation S410. In operation S410, a plurality of subkeys are calculated in advance. For example, the precalculator 160 may associate and index candidate symbols available for user ID information with a first predetermined number of group indexes, respectively, and calculate first subkeys respectively associated with the indexed candidate symbols. When symbols in user ID information are partitioned into symbol groups, the first predetermined number may be a maximum number of the symbol groups. When the partitioning is not applied, the first predetermined number may be one. Also, the precalculator 160 may associate and index candidate permutations derivable from at least some of a second predetermined number of symbol indexes with the group indexes, respectively, and calculate second subkeys respectively associated with the indexed candidate permutations. The second predetermined number may be a maximum number of symbols in each symbol group.

Subsequently, the pre-calculated plurality of subkeys are stored in the storage 180 (S420). The stored subkeys may be arrayed in one or a plurality of subkey groups. The total number of subkey groups may be a first predetermined number. For example, the precalculator 160 may store the first subkeys and the second subkeys in the storage 180. The key generator 140 may use the stored subkeys to generate a cryptographic key corresponding to user ID information.

In operation S430, a plurality of symbols are identified from user ID information, and at least one permutation is derived from the plurality of symbols. For example, the input analyzer 120 may identify a plurality of symbols from the user ID information and partition the symbols into a plurality of symbol groups. Then, from each symbol group, the input analyzer 120 may derive a permutation of at least one symbol index corresponding to at least one symbol in the symbol group on a one-to-one basis. When the partitioning is not applied, the input analyzer 120 may identify a plurality of symbols from the user ID information and derive the permutation of symbol indexes corresponding to the symbols on a one-to-one basis.

In operation S440, a plurality of first pre-calculated keys respectively corresponding to the identified plurality of symbols and at least one second pre-calculated key respectively corresponding to the derived at least one permutation are acquired. For example, as mentioned above in connection with Equation 5, the key generator 140 may acquire a discrete logarithm value $x(z)$ of a hash value $h(z)$. In another example, as mentioned above in connection with Equation 10, the key generator 140 may acquire a discrete logarithm value $x(j, z)$ of a hash value $h(j, z)$ ($1 \leq j \leq p$).

In operation S450, a private key corresponding to the user ID information is generated from the pre-calculated keys. For example, as mentioned above in connection with Equation 5, the key generator 140 may generate the private key $x$ by summing the discrete logarithm values $x(z)$. In another example, as mentioned above in connection with Equation 10, the key generator 140 may generate the private key $x$ by summing the discrete logarithm values $x(j, z)$.

Meanwhile, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers. According to other exemplary embodiments, a computer program for performing the process described herein may be provided. The program may be stored in a medium, such as a computer-readable storage medium, to perform the process in combination with hardware.

According to exemplary embodiments, the time required for generating a cryptographic key, such as a private key, based on a user ID can be remarkably reduced, and the key can be issued in real time.

According to exemplary embodiments, it is possible to reduce a considerable amount of precalculation required for existing TDL-IBC.

According to exemplary embodiments, it is possible to efficiently build a key issuing server at a low cost.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A key generation apparatus, comprising:
an input analyzer configured to identify a plurality of symbols from user identity (ID) information, and to derive at least one permutation from the plurality of symbols; and
a key generator configured to obtain a plurality of pre-calculated keys comprising a plurality of first pre-calculated keys and at least one second pre-calculated key, and to generate, from the plurality of pre-calculated keys, a cryptographic key corresponding to the user ID information, the plurality of first pre-calculated keys respectively corresponding to the plurality of symbols, the at least one second pre-calculated key respectively corresponding to the at least one permutation,
wherein at least one of the input analyzer and the key generator is executed by a processor.

2. The key generation apparatus of claim 1, wherein each of the plurality of pre-calculated keys represents a value of an element in a cyclic group, and wherein the value relates to one of the plurality of symbols or one of the at least one permutation.

3. The key generation apparatus of claim 2, wherein the key generator is further configured to apply a mathematical transformation to the plurality of pre-calculated keys to generate the cryptographic key.

4. The key generation apparatus of claim 1, wherein each of the plurality of symbols is one of a plurality of candidate symbols, wherein each of the at least one permutation is one of a plurality of candidate permutations, and wherein each of the plurality of candidate permutations is derivable from at least part of the plurality of candidate symbols.

5. The key generation apparatus of claim 4, further comprising: a storage having stored therein a plurality of subkeys arranged in a first predetermined number of subkey groups,
wherein the key generator is further configured to search one or a plurality of subkey groups among the first predetermined number of subkey groups to obtain, from the storage, the plurality of first pre-calculated keys and the at least one second pre-calculated key, wherein each of the first predetermined number of subkey groups comprises a plurality of first subkeys and a plurality of second subkeys, wherein each of the plurality of first subkeys corresponds to a respective one of the plurality of candidate symbols such that the plurality of first pre-calculated keys is obtainable from the storage, and wherein each of the plurality of second subkeys corresponds to a respective one of the plurality of candidate permutations such that the at least one second pre-calculated key is obtainable from the storage.

6. The key generation apparatus of claim 5, wherein each of the plurality of candidate permutations is a permutation of at least part of a second predetermined number of symbol indexes, and wherein the input analyzer is further configured to associate the plurality of symbols with a plurality of symbol indexes among the second predetermined number of symbol indexes, respectively, to derive a permutation of the plurality of symbol indexes as the at least one permutation.

7. The key generation apparatus of claim 6, wherein the first predetermined number is equal to one.

8. The key generation apparatus of claim 5, wherein each of the plurality of candidate permutations is a permutation of at least part of a second predetermined number of symbol indexes, wherein the input analyzer is further configured to partition the plurality of symbols into a plurality of symbol groups, wherein the at least one permutation comprises a plurality of permutations respectively corresponding to the plurality of symbol groups, wherein each of the plurality of symbol groups comprises at least one of the plurality of symbols, and wherein the input analyzer is further configured to associate the at least one symbol with at least one symbol index among the second predetermined number of symbol indexes, respectively, to derive a permutation of the at least one symbol index as a corresponding one of the plurality of permutations for said each symbol group.

9. The key generation apparatus of claim 8, wherein the first predetermined number is equal to or greater than two, and wherein the key generator is further configured to identify a corresponding one of the plurality of subkey groups for said each symbol group to search the corresponding subkey group to obtain, from the storage, at least one of the plurality of first pre-calculated keys and one of the at least one second pre-calculated key, the at least one obtained first pre-calculated key respectively corresponding to the at least one symbol, the obtained second pre-calculated key corresponding to the permutation of the at least one symbol index.

10. The key generation apparatus of claim 5, further comprising: a precalculator configured to calculate, and store in the storage, the plurality of subkeys before the input analyzer identifies the plurality of symbols.

11. The key generation apparatus of claim 10, wherein said each first subkey represents a first discrete logarithm value of a first element in a discrete logarithm cyclic group, wherein each second subkey represents a second discrete logarithm value of a second element in the discrete logarithm cyclic group, and wherein the pre-calculator is further configured to generate the first element from the respective candidate symbol to calculate the first discrete logarithm value, and to generate the second element from the respective candidate permutation to calculate the second discrete logarithm value.

12. The key generation apparatus of claim 11, wherein the pre-calculator is further configured to apply a hash function to the respective candidate symbol to generate the first element, and to apply the hash function to the respective candidate permutation to generate the second element.

13. A key generation method, comprising:
identifying a plurality of symbols from user identity (ID) information;
deriving at least one permutation from the plurality of symbols;
obtaining a plurality of pre-calculated keys comprising a plurality of first pre-calculated keys and at least one second pre-calculated key, the plurality of first pre-calculated keys respectively corresponding to the plurality of symbols, the at least one second pre-calculated key respectively corresponding to the at least one permutation; and
generating, by a processor, from the plurality of pre-calculated keys, a cryptographic key corresponding to the user ID information.

14. The key generation method of claim 13, wherein each of the plurality of pre-calculated keys represents a value of an element in a cyclic group, and wherein the value relates to one of the plurality of symbols or one of the at least one permutation.

15. The key generation method of claim 14, further comprising: applying a mathematical transformation to the plurality of pre-calculated keys to generate the cryptographic key.

16. The key generation method of claim 13, wherein each of the plurality of symbols is one of a plurality of candidate symbols, wherein each of the at least one permutation is one of a plurality of candidate permutations, and wherein each of the plurality of candidate permutations is derivable from at least part of the plurality of candidate symbols.

17. The key generation method of claim 16, further comprising:
storing, in a storage, a plurality of subkeys arranged in a first predetermined number of subkey groups in a storage; and
searching one or a plurality of subkey groups among the first predetermined number of subkey groups to obtain, from the storage, the plurality of first pre-calculated keys and the at least one second pre-calculated key,
wherein each of the first predetermined number of subkey groups comprises a plurality of first subkeys and a plurality of second subkeys, wherein each of the plurality of first subkeys corresponds to a respective one of the plurality of candidate symbols such that the plurality of first pre-calculated keys are obtainable from the storage, and wherein each of the plurality of second subkeys corresponds to a respective one of the plurality of candidate permutations such that the at least one second pre-calculated key is obtainable from the storage.

18. The key generation method of claim 17, wherein each of the plurality of candidate permutations is a permutation of at least part of a second predetermined number of symbol indexes, and wherein the key generation method further comprises:
associating the plurality of symbols with a plurality of symbol indexes among the second predetermined number of symbol indexes, respectively, to derive a permutation of the plurality of symbol indexes as the at least one permutation.

19. The key generation method of claim 18, wherein the first predetermined number is equal to one.

20. The key generation method of claim 17, wherein each of the plurality of candidate permutations is a permutation of at least part of a second predetermined number of symbol indexes, and wherein the key generation method further comprises:
partitioning the plurality of symbols into a plurality of symbol groups, the at least one permutation comprising a plurality of permutations respectively corresponding to the plurality of symbol groups, each of the plurality of symbol groups comprising at least one of the plurality of symbols; and
associating the at least one symbol with at least one symbol index among the second predetermined number of symbol indexes, respectively, to derive a permutation of the at least one symbol index as a corresponding one of the plurality of permutations for said each symbol group.

21. The key generation method of claim 20, wherein the first predetermined number is equal to or greater than two, and wherein the key generation method further comprises:
identifying a corresponding one of the plurality of subkey groups for said each symbol group to search the corresponding subkey group to obtain, from the storage, at least one of the plurality of first pre-calculated keys and one of the at least one second pre-calculated key, the at least one obtained first pre-calculated key respectively corresponding to the at least one symbol, the obtained second pre-calculated key corresponding to the permutation of the at least one symbol index.

22. The key generation method of claim 17, further comprising:
before the identifying of the plurality of symbols, calculating the plurality of subkeys to store the plurality of subkeys in the storage.

23. The key generation method of claim 22, wherein said each first subkey represents a first discrete logarithm value of a first element in a discrete logarithm cyclic group, wherein said each second subkey represents a second discrete logarithm value of a second element in the discrete logarithmic cyclic group, and wherein the key generation method further comprises:
generating the first element from the respective candidate symbol to calculate the first discrete logarithm value; and
generating the second element from the respective candidate permutation to calculate the second discrete logarithm value.

24. The key generation method of claim 23, further comprising:
applying a hash function to the respective candidate symbol to generate the first element; and
applying the hash function to the respective candidate permutation to generate the second element.

25. A computer program stored in a non-transitory computer readable medium to perform in combination with hardware:
- identifying a plurality of symbols from user identity (ID) information;
- deriving at least one permutation from the plurality of symbols;
- obtaining a plurality of pre-calculated keys comprising a plurality of first pre-calculated keys and at least one second pre-calculated key, the plurality of first pre-calculated keys respectively corresponding to the plurality of symbols, the at least one second pre-calculated key respectively corresponding to the at least one permutation; and
- generating, from the plurality of pre-calculated keys, a cryptographic key corresponding to the user ID information.

* * * * *